US012148402B2

(12) United States Patent
Hatakenaka et al.

(10) Patent No.: US 12,148,402 B2
(45) Date of Patent: Nov. 19, 2024

(54) PANEL DRIVE CIRCUIT

(71) Applicant: IIX INC., Tokyo (JP)

(72) Inventors: Makoto Hatakenaka, Tokyo (JP); Takashi Sakamoto, Tokyo (JP); Mitsuo Hagiwara, Tokyo (JP); Norimasa Senda, Tokyo (JP); Yoshihide Minegishi, Tokyo (JP); Hiroshi Murase, Tokyo (JP)

(73) Assignee: IIX INC., Tokyo (JP)

( * ) Notice: Subject to any disclaimer, the term of this patent is extended or adjusted under 35 U.S.C. 154(b) by 0 days.

(21) Appl. No.: 18/279,152

(22) PCT Filed: Mar. 10, 2021

(86) PCT No.: PCT/JP2021/009496
§ 371 (c)(1),
(2) Date: Aug. 28, 2023

(87) PCT Pub. No.: WO2022/190247
PCT Pub. Date: Sep. 15, 2022

(65) Prior Publication Data

US 2024/0135894 A1 Apr. 25, 2024
US 2024/0233669 A9 Jul. 11, 2024

(51) Int. Cl.
*G09G 3/36* (2006.01)

(52) U.S. Cl.
CPC ... *G09G 3/3611* (2013.01); *G09G 2320/0233* (2013.01); *G09G 2320/0626* (2013.01); *G09G 2320/0673* (2013.01); *G09G 2360/16* (2013.01)

(58) Field of Classification Search
CPC ......... G09G 3/3611; G09G 2320/0233; G09G 2320/0626; G09G 2320/0673; G09G 2360/16
See application file for complete search history.

(56) References Cited

U.S. PATENT DOCUMENTS 6,697,041 B1 * 2/2004 Tamai .................. G09G 3/3688 345/98
8,743,155 B2 * 6/2014 Ishii ..................... G09G 3/3208 345/204

(Continued)

FOREIGN PATENT DOCUMENTS

JP H03-18823 A 1/1991
JP H10-341451 A 12/1998

(Continued)

OTHER PUBLICATIONS

May 25, 2021, International Search Report issued in International Patent Application No. PCT/JP2021/009496.

(Continued)

*Primary Examiner* — Kenneth Bukowski
(74) *Attorney, Agent, or Firm* — Oliff PLC

(57) ABSTRACT

A panel drive circuit having an input interface to which an image signal is input, a gamma correction circuit that corrects an image processing signal generated by an image processing circuit performing image processing on the image signal input to the input interface, such that a gamma correction signal thus generated has predetermined gamma characteristics, an unevenness correction circuit that corrects the gamma correction signal generated through the correction by the gamma correction circuit, based on correction data for reducing unevenness of a display panel, and an D/A convertor that has a variable output voltage range, and performs D/A conversion on an unevenness correction signal generated through the correction by the unevenness correction circuit and outputs the signal thus generated to the display panel, and the unevenness correction circuit changes the correction method according to the output voltage range of the D/A convertor.

4 Claims, 5 Drawing Sheets

(56) References Cited

U.S. PATENT DOCUMENTS

| | | | | |
|---|---|---|---|---|
| 2011/0050747 | A1* | 3/2011 | Ishii | G09G 3/3208 345/690 |
| 2018/0166030 | A1 | 6/2018 | Liu et al. | |
| 2019/0037188 | A1* | 1/2019 | Hatakenaka | G09G 3/3233 |
| 2019/0137334 | A1* | 5/2019 | Murase | G09G 3/32 |
| 2020/0175907 | A1* | 6/2020 | Murase | G09G 3/20 |
| 2020/0184883 | A1* | 6/2020 | Murase | G09G 3/3208 |

FOREIGN PATENT DOCUMENTS

| | | | |
|---|---|---|---|
| JP | 2000-221928 | A | 8/2000 |
| JP | 2006-163290 | A | 6/2006 |
| JP | 2011-118361 | A | 6/2011 |
| JP | 2015-103174 | A | 6/2015 |
| JP | 6445678 | B2 | 12/2018 |
| WO | 2018/116337 | A1 | 6/2018 |

OTHER PUBLICATIONS

Sep. 12, 2023, International Preliminary Report on Patentability issued in International Patent Application No. PCT/JP2021/009496.

* cited by examiner

PANEL DRIVE CIRCUIT

TECHNICAL FIELD

The present invention relates to a panel drive circuit that is incorporated into a display panel and performs unevenness correction based on correction data.

BACKGROUND ART

Panel drive circuits (semiconductor integrated circuits) of display panels such as liquid crystal panels and organic EL panels generally include a gamma correction circuit for setting gamma characteristics (gamma values) in accordance with the characteristics of each individual display panel. Also, there are panel drive circuits that include an unevenness correction circuit for correcting luminance unevenness and color unevenness that occur at a hardware level, by superimposing reverse phase data of the unevenness on the original image per region or per pixel of the display panel.

In the case where, in a panel drive circuit that is provided with a gamma correction circuit and an unevenness correction circuit, the unevenness correction circuit is upstream of the gamma correction circuit (i.e., the unevenness correction circuit performs processing on inputs from outside before the gamma correction circuit), the luminance characteristics of the display panel with respect to the output of the unevenness correction circuit are known (generally, parameters are determined such that the gamma correction circuit is adjusted to predetermined gamma characteristics before implementing unevenness correction, and individual differences between products are suppressed) as the product specification of a panel module that combines the panel drive circuit (the gamma correction circuit, in particular) and the display panel, thus enabling unevenness correction in the unevenness correction circuit to be performed utilizing these luminance characteristics. For example, because a derivative (dL/dV) indicating the change in luminance (dL) to the change in input digital value (dV) is determined, if the luminance characteristics of the panel with respect to inputs are curve characteristics in which y (gamma value)=2.2, as the product specification of the panel module, the unevenness correction circuit need only perform unevenness correction, using correction data calculated based on the derivative.

In the case of wanting to obtain display with gamma characteristics other than the gamma characteristics (gamma values) that have been set, such as in the case of wanting to change the gamma characteristics in order to obtain display that is easy to see outdoors where it is bright, for example, the settings of the gamma correction circuit have to be changed, although there is, however, a problem in that it becomes necessary, at this time, to perform unevenness correction after generating correction data adjusted to the changed gamma characteristics, complicating the unevenness correction algorithm.

In contrast, a panel drive circuit described in Patent Document 1 is a known panel drive circuit in which the unevenness correction circuit is downstream of the gamma correction circuit. This panel drive circuit is able to perform unevenness correction adjusted for the characteristics of each individual display panel while suppressing increases in cost and production time, in the case of performing unevenness correction downstream of gamma correction.

CITATION LIST

Patent Document

Patent Document 1: JP 6445678

SUMMARY OF INVENTION

Technical Problem

Incidentally, in recent years, in order to improve the accuracy of luminance control of display panels, a system in which the output voltage range of D/A conversion means (D/A converter) is variable has appeared, and when the panel drive circuit described in Patent Document 1 is directly applied to such a system, a problem arises in that, when the output voltage range has changed, unevenness correction by the unevenness correction circuit does not work properly, resulting in unevenness not decreasing and possibly even increasing.

The present invention has been made in view of the above circumstances, and an object thereof is to provide a panel drive circuit that is able to appropriately perform unevenness correction downstream of gamma correction even in the case where the output voltage range of a D/A conversion means is variable.

Solution to Problem

In order to solve the above problems, a panel drive circuit according to the present invention includes an image signal input unit to which an image signal is input, a gamma correction means configured to correct the image signal input to the image signal input unit or a first processing signal generated by first processing being performed on the image signal input to the image signal input unit, such that a gamma correction signal thus generated has predetermined gamma characteristics, an unevenness correction means configured to correct the gamma correction signal generated through the correction by the gamma correction means or a second processing signal generated by second processing being performed on the gamma correction signal generated through the correction by the gamma correction means, based on correction data for reducing unevenness of a display panel, and a D/A conversion means having a variable output voltage range and configured to perform digital-to-analog conversion on an unevenness correction signal generated through the correction by the unevenness correction means and output a signal thus generated to the display panel, the unevenness correction means changing a correction method according to the output voltage range of the D/A conversion means.

The unevenness correction means may have an unevenness correction table corresponding to a case where the output voltage range is a reference voltage range $V_0$, and the unevenness correction means, in the case where the output voltage range is $V_0$, may generate the unevenness correction signal by adding the gamma correction signal or the second processing signal to a differential signal generated by the gamma correction signal or the second processing signal being corrected with reference to the unevenness correction table, and, in a case where the output voltage range is V which is different from $V_0$, may generate the unevenness correction signal by adding the gamma correction signal or the second processing signal to a differential signal generated by a result of multiplying the gamma correction signal or the second processing signal by an input coefficient $V/V_0$ being corrected with reference to the unevenness correction table and thereafter being multiplied by an output coefficient $V_0/V$.

Advantageous Effects of Invention

With a panel drive circuit according to the present invention, unevenness correction can be appropriately performed downstream of gamma correction, even in the case where the output voltage range of a D/A conversion means is variable.

DESCRIPTION OF EMBODIMENTS

A mode for carrying out the present invention will be described, using the drawings.

Figure 1:
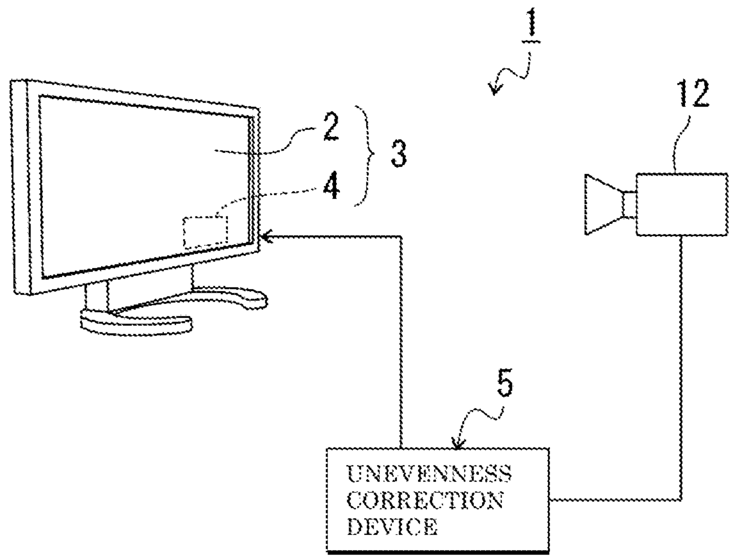
FIG. 1 is an illustrative diagram showing an unevenness correction system according to a mode for carrying out the invention.

FIG. 1 shows an unevenness correction system according to the present embodiment. This unevenness correction system 1 generates correction data in order to correct image signals that are input to a display panel 2 constituted by a liquid crystal panel based on the correction data and reduce unevenness of the display panel 2, and is provided with a panel drive circuit 4 that is incorporated into the display panel 2 and constitutes a panel module 3 and with an unevenness correction device 5.

Figure 2:
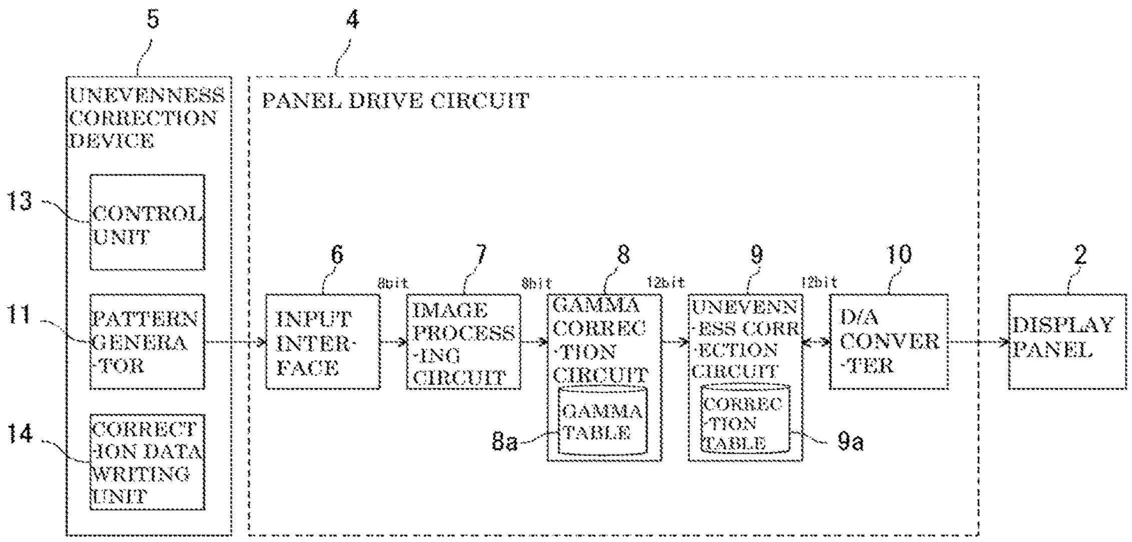
FIG. 2 is an illustrative diagram showing detailed configurations of a panel drive circuit and an unevenness correction device constituting the unevenness correction system in FIG. 1.

As shown in FIG. 2, the panel drive circuit 4 is provided with an input interface 6 to which a digital image signal is input, an image processing circuit 7 that performs image processing on the image signal input to the input interface 6, a gamma correction circuit 8 that performs gamma correction on an image processing signal generated through the image processing by the image processing circuit 7, such that the gamma correction signal thus generated has predetermined gamma characteristics, with reference to a gamma table 8*a* set in accordance with the individual characteristics of the display panel 2 into which the panel drive circuit 4 is incorporated, an unevenness correction circuit 9 that performs unevenness correction on the gamma correction signal generated through the gamma correction by the gamma correction circuit 8, with reference to a correction table 9*a* in which correction data for reducing unevenness of the display panel 2 is recorded, and a D/A converter 10 that has a variable output voltage range, and performs digital-to-analog (D/A) conversion on an unevenness correction signal generated through the unevenness correction by the unevenness correction circuit 9 and outputs the signal thus generated to the display panel 2.

The unevenness correction circuit 9 changes the correction method according to the output voltage range of the D/A converter 10. Here, the unevenness correction circuit 9 has, as the correction table 9*a*, a table corresponding to the case where the output voltage range of the D/A converter 10 is a reference voltage range $V_0$, and, in the case where the output voltage range is $V_0$, generates the unevenness correction signal by adding the gamma correction signal to a differential signal generated by correcting the gamma correction signal with reference to the correction table 9*a*, and, in the case where the output voltage range has been changed to V which is different from $V_0$, generates the unevenness correction signal by adding the gamma correction signal to a differential signal generated by the result of multiplying the gamma correction signal by an input coefficient $V/V_0$ being corrected with reference to the correction table 9*a* and thereafter being multiplied by an output coefficient $V_0/V$.

The unevenness correction device 5 is provided with a pattern generator 11 that outputs the digital image signal to the input interface 6, when connected to the panel drive circuit 4, a control unit 13 that integrally controls the pattern generator 11 and an individual image sensor camera 12 (refer to FIG. 1) that capture images of the display panel 2, and a correction data writing unit 14 that writes correction data generated under the control of the control unit 13 to the correction table 9*a* of the unevenness correction circuit 9.

Figure 3:
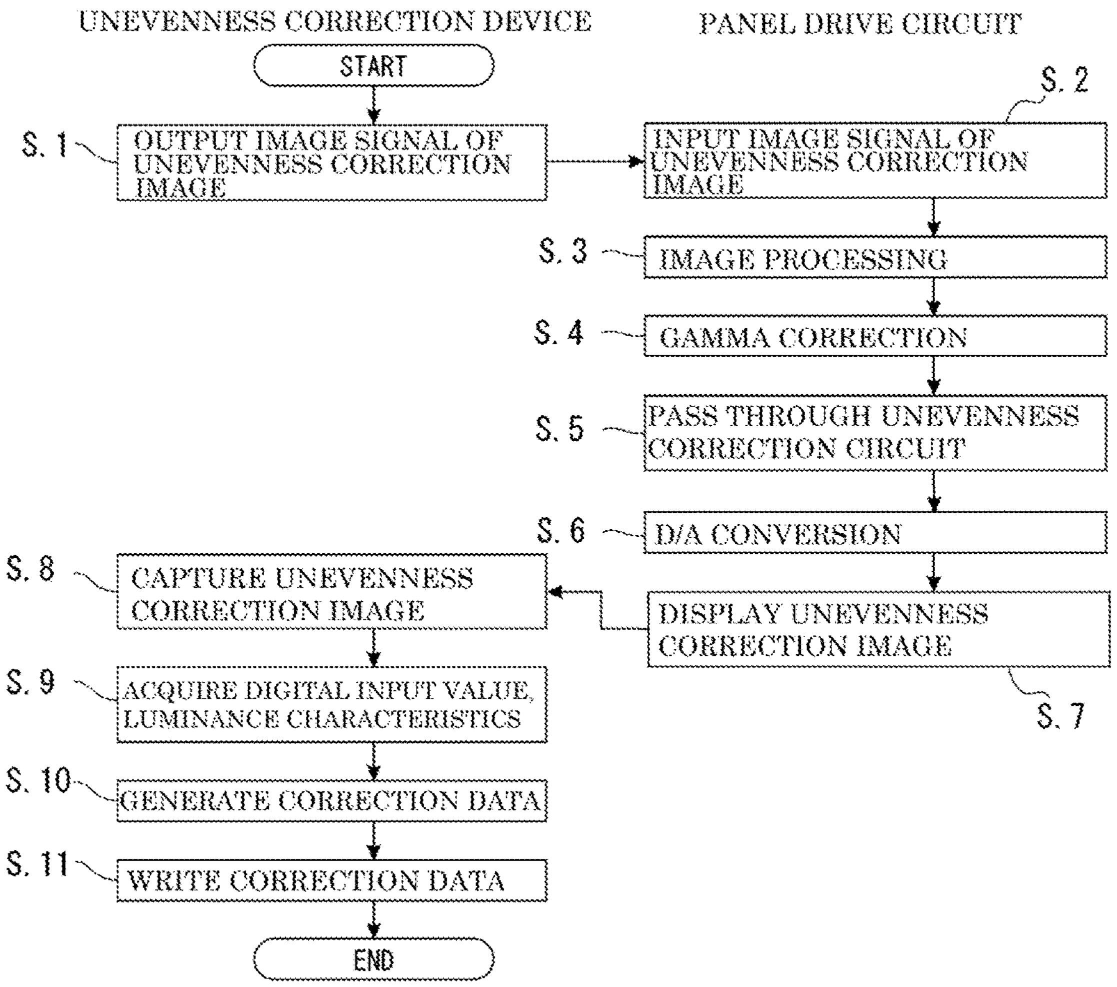
FIG. 3 is a flowchart showing operations of the unevenness correction system in FIG. 1 in chronological order.

At the time of generating correction data, the control unit 13 of the unevenness correction device 5, as shown in FIG. 3, outputs an 8-bit digital image signal of an unevenness correction image (e.g., raster image) to the input interface 6 with the pattern generator 11 (step 1 ("S.1" in FIG. 3; this similarly applies below)).

Figure 4:
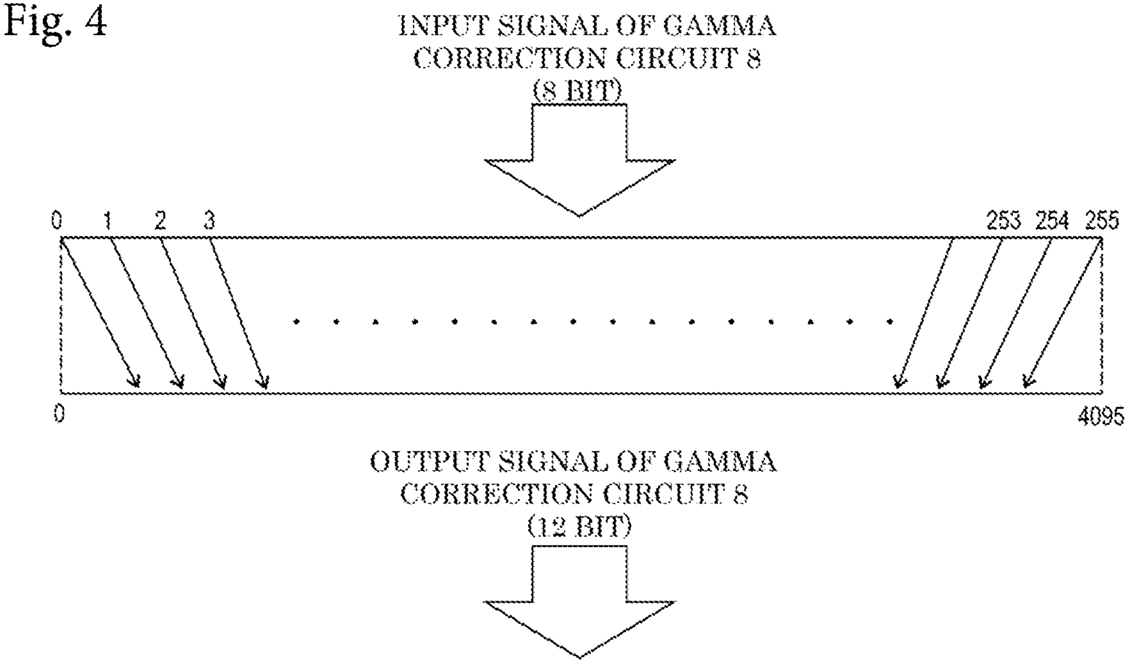
FIG. 4 is an illustrative diagram showing scale conversion of input-output signals in a gamma correction circuit of the unevenness correction system in FIG. 1.

The image signal input to the input interface 6 undergoes image processing in the image processing circuit 7 (steps 2 and 3), and is input to the gamma correction circuit 8 as an image processing signal. In the gamma correction circuit 8, the input image processing signal undergoes gamma correction with reference to the gamma table (step 4), and is output to the unevenness correction circuit 9. In the unevenness correction circuit 9, the input gamma correction signal undergoes unevenness correction with reference to the correction table 9*a*, and a 12-bit unevenness correction signal thus generated is output to the D/A converter 10 (FIG. 4), although, at this point in time, unevenness correction is not actually performed since correction data has not yet been input to the correction table, and thus the unevenness correction signal matches the gamma correction signal (step 5).

In the D/A converter 10, the input unevenness correction signal undergoes D/A conversion with the output voltage range set to $V_0$ (step 6), an analog image signal thus generated is output to the display panel 2, and an unevenness correction image is displayed on the display panel 2 (step 7).

Next, the control unit 13 captures the unevenness correction image displayed on the display panel 2 with the camera 12 (step 8), derives the luminance for each pixel of the display panel 2, based on the image captured by the camera 12 with a method described in JP 2016-004037A, for example (step 9), and generates correction data, based on the derived luminance (step 10). Correction data is desirably derived for each of predetermined gray levels, by displaying and capturing the unevenness correction image multiple times while changing the gray levels.

The control unit 13 then writes the generated correction data to the correction table 9*a* of the unevenness correction circuit 9 with the correction data writing unit 14 (step 11), thereby enabling the panel drive circuit 4 to perform unevenness correction on input image signals based on the correction data.

At the time of unevenness correction, the unevenness correction circuit 9, in the case where the output voltage range of the D/A converter 10 is the reference voltage range $V_0$, generates an output signal (unevenness correction signal) by adding the input signal (gamma correction signal) to a differential signal generated by correcting the input signal with reference to the unevenness correction table 9*a*, and, in the case where the output voltage range of the D/A converter 10 has been changed to V which is different from $V_0$, generates an output signal by adding the input signal to a differential signal generated by the result of multiplying the input signal by the input coefficient $V/V_0$ being corrected with reference to the correction table 9*a* and thereafter being multiplied by the output coefficient $V_0/V$.

Figure 5:
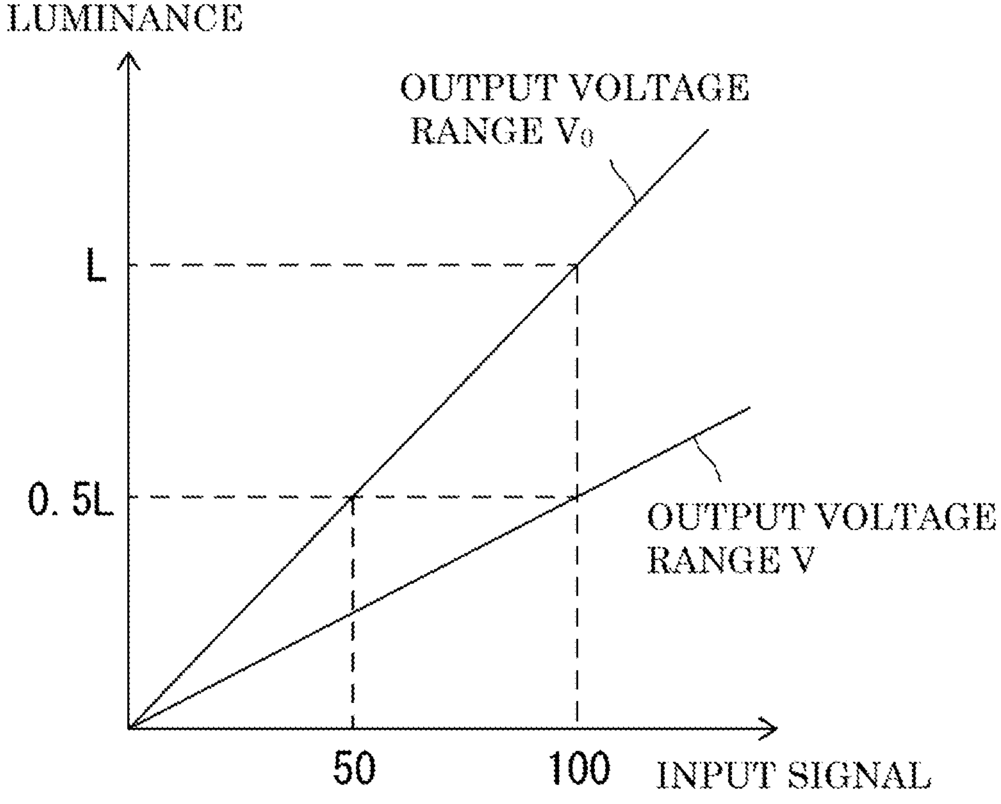
FIG. 5 is an illustrative diagram showing the change in luminance when an output voltage range of a D/A converter of the panel drive circuit in FIG. 2 is changed from a reference voltage range.
Figure 6:
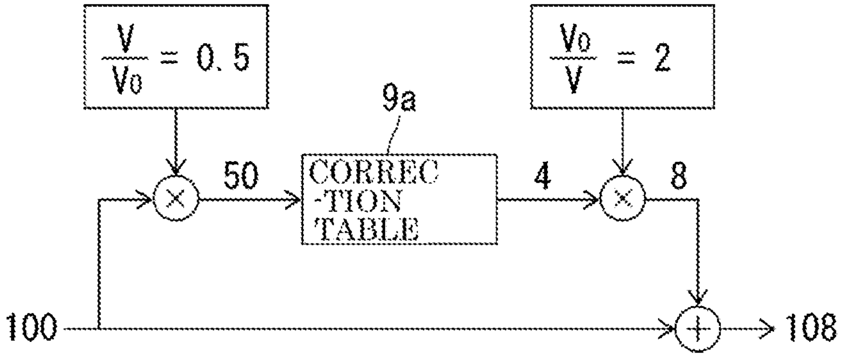
FIG. 6 is an illustrative diagram showing an unevenness correction method for when the output voltage range of the D/A converter of the panel drive circuit in FIG. 2 is changed from the reference voltage range.

For example, assume that the luminance in the case where the output voltage range is V corresponds to 50% of the luminance in the case where the output voltage range is $V_0$ ($V:V_0=50:100$), as shown in FIG. 5, and that, in the unevenness correction circuit 9, in the case where the output voltage range is $V_0$, the level of the differential signal obtained with reference to the correction table 9*a* when the level of the input signal is 100 (luminance is L) is 10 (level of output signal is 100+10=110), and the level of the differential signal obtained with reference to the correction table 9*a* when the input signal level is 50 (luminance is 0.5 L) is 4 (level of output signal is 50+4=54). At this time, the luminance is 0.5 L when the output voltage range is changed to V, even when the level of the input signal is 100, and thus a differential signal (level 4) corresponding thereto needs to be obtained from the correction table 9*a*. In the case of the differential signal when the luminance is 0.5 L, the correction table 9*a* need only be referenced, assuming that the level of the input signal is 100×0.5=50, and thus, as shown in FIG. 6, a differential signal of level 4 is obtained with reference to the correction table 9*a* at level 50 obtained by level 100 of the input signal being multiplied by the input coefficient $V/V_0=0.5/1=0.5$. The differential signal thus obtained has been prepared such that the correct luminance correction result is obtained in the case where the output voltage range is $V_0$, and thus, in the case where the output voltage range is V, the luminance correction amount will be $V/V_0=0.5/1=0.5$ times, and thus this result is corrected to a differential signal of level 8 by being multiplied by the output coefficient $V_0/V=1/0.5=2$, and the result thereof is added to the input signal to generate an output signal of level 108.

The panel drive circuit 4 according to the present embodiment is provided with the input interface 6 to which an image signal is input, the gamma correction circuit 8 that corrects an image processing signal generated by the image processing circuit 7 performing image processing on the image signal input to the input interface 6, such that the gamma correction signal thus generated has predetermined gamma characteristics, the unevenness correction circuit 9 that corrects the gamma correction signal generated through the correction by the gamma correction circuit 8, based on correction data for reducing unevenness of the display panel 2, and the D/A converter 10 that has a variable output voltage range, and performs D/A conversion on the unevenness correction signal generated through the correction by the unevenness correction circuit 9 and outputs the signal thus generated to the display panel 2. The unevenness correction circuit 9 changes the correction method according to the output voltage range of the D/A converter 10, and thus, even when the output voltage range of the D/A converter 10 is variable, is able to appropriately perform unevenness correction according to the changed output voltage range downstream of the gamma correction.

In this mode, specifically, the unevenness correction circuit 9 has the correction table 9*a* corresponding to the case where the output voltage range is the reference voltage range $V_0$, and, in the case where the output voltage range of the D/A converter 10 is $V_0$, generates the unevenness correction signal by adding the gamma correction signal to a differential signal generated by the gamma correction signal being corrected with reference to the correction table 9*a*, and, in the case where the output voltage range is V which is different from $V_0$, generates the unevenness correction signal by adding the gamma correction signal to a differential signal generated by the result of multiplying the gamma correction signal by the input coefficient $V/V_0$ being corrected with reference to the correction table 9*a* and thereafter being multiplied by the output coefficient $V_0/V$, and thus, even when the output voltage range is changed to V, unevenness correction adjusted accordingly is appropriately performed.

Although a mode for carrying out the present invention is illustrated above, the embodiments of the present invention are not limited to that described above, and may be modified as appropriate without departing from the spirit of the invention.

For example, in the above mode, the display panel 2 is a liquid crystal panel, but the display panel 2 may be an organic EL panel, a plasma display panel, a mini LED panel, a micro LED panel, or the like, and the gamma correction circuit 8 outputs the 8-bit input signal at 12 bits in order to ensure accuracy after conversion in gamma correction, but any amount of information such as 10 bits, 11 bits and 14 bits may be used instead of 12 bits.

Also, the image processing by the image processing circuit 7 may be any processing, and may be performed downstream of the gamma correction circuit 8 (upstream of the unevenness correction circuit 9) instead of upstream, or may be performed upstream and downstream of the gamma correction circuit 8, and the gamma table 8*a* is not limited to a single table, and may be a multi-table in which switching occurs between multiple referents.

LIST OF REFERENCE NUMERALS

2 Display panel
4 Panel drive circuit
6 Input interface (image signal input unit)
8 Gamma correction circuit (gamma correction means)
9 Unevenness correction circuit (unevenness correction means)
9*a* Correction table (unevenness correction table)
D/A converter (D/A conversion means)

The invention claimed is:

1. A panel drive circuit comprising:

an image signal input unit to which an image signal is input;

a gamma correction means configured to correct the image signal input to the image signal input unit or a first processing signal generated by first processing being performed on the image signal input to the image signal input unit, such that a gamma correction signal thus generated has predetermined gamma characteristics;

an unevenness correction means configured to correct the gamma correction signal generated through the correction by the gamma correction means or a second processing signal generated by second processing being performed on the gamma correction signal generated through the correction by the gamma correction means, based on correction data for reducing unevenness of a display panel; and a D/A (digital-to-analog) conversion means having a variable output voltage range and configured to perform digital-to-analog conversion on an unevenness correction signal generated through the correction by the unevenness correction means and output a signal thus generated to the display panel, wherein the unevenness correction means changes a correction method according to the output voltage range of the D/A conversion means.

2. The panel drive circuit according to claim 1, wherein the unevenness correction means has an unevenness correction table corresponding to a case where the output voltage range is a reference voltage range $V_0$, in the case where the output voltage range is $V_0$, the unevenness correction means generates the unevenness correction signal by adding the gamma correction signal or the second processing signal to a differential signal generated by the gamma correction signal or the second processing signal being corrected with reference to the unevenness correction table, and in a case where the output voltage range is V which is different from $V_0$, the unevenness correction means generates the unevenness correction signal by adding the gamma correction signal or the second processing signal to a differential signal generated by a result of multiplying the gamma correction signal or the second processing signal by an input coefficient $V/V_0$ being corrected with reference to the unevenness correction table and thereafter being multiplied by an output coefficient $V_0/V$.

3. The panel drive circuit according to claim 1, wherein the unevenness correction means changes the correction method according to the output voltage range of the D/A conversion means, while the predetermined gamma characteristics of the gamma correction means are unchanged.

4. The panel drive circuit according to claim 1, wherein the unevenness correction means generates an output signal, which is the unevenness correction signal, using a first equation, when the output voltage range of the D/A conversion means is a reference voltage range $V_0$, and the unevenness correction means generates the output signal, which is the unevenness correction signal, using a second equation different from the first equation, when the output voltage range of the D/A conversion means is a voltage V that is different from the reference voltage range $V_0$.

* * * * *